(12) United States Patent
Sheehan

(10) Patent No.: US 12,480,835 B2
(45) Date of Patent: Nov. 25, 2025

(54) AUTOMATIC LIQUID TANK JACKET TESTING APPARATUS

(71) Applicant: Unison Engineering Services Limited, Limerick (IE)

(72) Inventor: Paul Sheehan, Limerick (IE)

(73) Assignee: Unison Engineering Services Limited, Limerick (IE)

( * ) Notice: Subject to any disclaimer, the term of this patent is extended or adjusted under 35 U.S.C. 154(b) by 285 days.

(21) Appl. No.: 18/215,203

(22) Filed: Jun. 28, 2023

(65) Prior Publication Data
US 2024/0003776 A1   Jan. 4, 2024

(30) Foreign Application Priority Data
Jun. 29, 2022   (EP) ..................................... 22182022

(51) Int. Cl.
*G01M 3/32*   (2006.01)

(52) U.S. Cl.
CPC ................................. *G01M 3/3272* (2013.01)

(58) Field of Classification Search
CPC .............................................. G01F 23/14–185
See application file for complete search history.

(56) References Cited

U.S. PATENT DOCUMENTS 5,117,677 A * 6/1992 Hendershot ............. G01M 3/32
340/605
2006/0048564 A1   3/2006 Russell

* cited by examiner

*Primary Examiner* — Alexander A Mercado
(74) *Attorney, Agent, or Firm* — Studebaker Brackett PLLC

(57) ABSTRACT

A testing apparatus is for a tank with a jacket having an internal wall shared with the tank and an external wall. The testing apparatus has an automated controller to perform tests even during use of the tanks in a production environment. There is supply system for delivering liquid at pressure above atmospheric to the jacket. The controller detects when the tank is filled to a level above the tank jacket height to create a higher pressure in the tank than is in the jacket. The controller monitors a parameter of the jacket to detect if there is a leak from the tank into the jacket. The parameter may be jacket pressure, arising after sealing the jacket, of flow via a venting valve as detected by a flow meter. A second test can be carried out irrespective of the level in the tank, be pressurising the jacket and monitoring it for a drop in pressure.

19 Claims, 1 Drawing Sheet

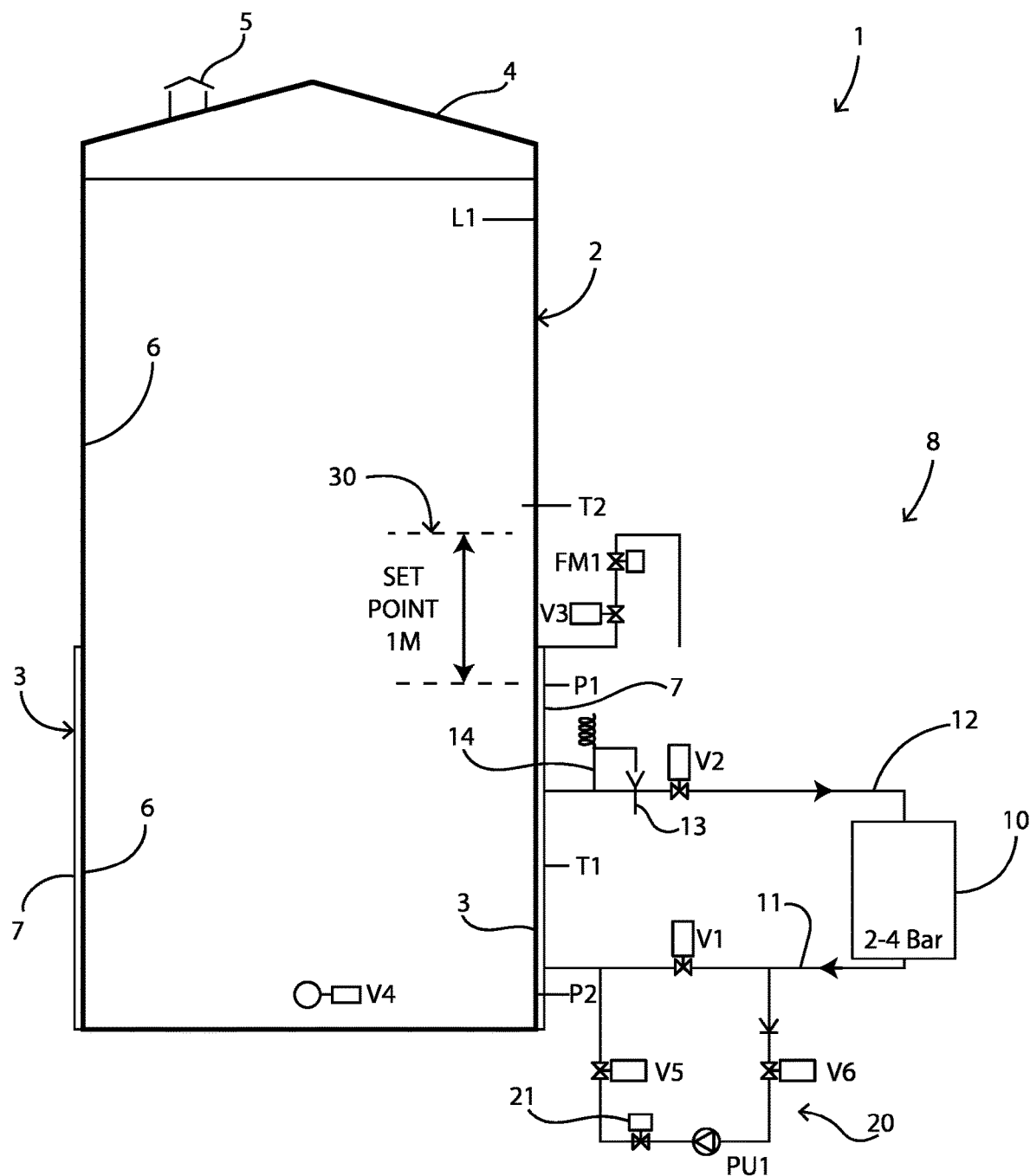

AUTOMATIC LIQUID TANK JACKET TESTING APPARATUS

INTRODUCTION

The present invention relates to testing of liquid tanks with jackets.

Currently most tanks with jackets require testing for cracks once a year. This crack testing requires the tank to be taken out of service, cleaned and the jacket disconnected from its water supply, a test engineer will then connect their test apparatus, normally a hydraulic pressure test to the jacket to detect if there is a crack in the jacket. If this hydraulic test fails and the crack in not visible a separate test is carried out to detect the location of this crack. If the crack is in the tank side of the jacket this often results in an eddy current test, a dye test or other similar test to detect the location of the crack. If no crack is detected in the tank side jacket, then it is assumed that the crack is in the outer side of the jacket and if this is not visible there may be a requirement for an eddy current test, dye test or other similar test to detect the crack location.

This testing normally requires the tank to be taken out of service for period of hours or days, it is time consuming for skilled personnel to complete the test due to health and safety regulations (confined spaces regulations etc). When an hydraulic test is completed, the tank is vulnerable to an undetected crack appearing between these annual tests, and this can lead to contamination of the product in the tank or extensive loss of cooling water during this period of time.

SUMMARY OF THE INVENTION

We describe a testing apparatus for a tank and a jacket having an internal wall shared with the tank and an external wall, the apparatus comprising:
  a controller with digital data processors,
  a supply system for delivering liquid at pressure above atmospheric to the jacket,
  wherein the controller is configured to perform a first test by:
    delivering liquid into the jacket at pressure above atmospheric,
    determining when the tank pressure is higher than a jacket start pressure, and then monitoring a parameter of the jacket (3) to detect if there is a leak from the tank into the jacket.

In some preferred examples, the controller is configured to determine when the tank is filled to a level above the tank jacket height for said step of determining when the tank pressure is higher than a jacket pressure.

In some preferred examples, the parameter is jacket pressure, the apparatus comprises a jacket pressure sensor and the controller is configured to perform steps of:
  after said delivering of liquid into the jacket, sealing the jacket,
  determining the jacket start pressure, said pressure being lower than the tank pressure,
  over a testing time period detecting if there is a change in pressure in the jacket which exceeds a tolerance level, and
  identifying that there is a potential leak in the jacket internal wall if there is an excessive jacket pressure change.

In some preferred examples, the testing apparatus comprises a venting valve for venting the jacket, and the controller is configured to cause the jacket to be vented by the venting valve before determining the jacket start pressure.

In some preferred examples, the controller is configured to deliver liquid under a pressure in the range of 2 Bar to 4 Bar into the jacket.

In some preferred examples, the controller is configured to determine the jacket start pressure only after it has determined that there is temperature uniformity between the tank and the jacket according to temperature sensors, to prevent a false test due to thermal expansion.

In some preferred examples, the apparatus comprises a flow meter linked with the jacket, and the controller is configured to use sensed flow from the jacket as said parameter, in which the controller is configured to vent the jacket only via the flow meter and to detect if there is a flow of liquid from the jacket and through the flow meter as an indication of a leak from the tank into the jacket.

In some preferred examples, the controller is configured to implement a second test by causing the supply system to deliver liquid into the jacket at an elevated pressure above atmospheric, to seal the jacket by for example closing a jacket venting valve, and determining if the pressure in the jacket drops over a time period, and generating an alert of a possible jacket external wall leak if there is a pressure drop in the jacket above a tolerance level.

In some preferred examples, the controller is configured to maintain a jacket pressure in the range of 2 Bar to 4 Bar for said second test.

In some preferred examples, the controller is configured to monitor temperature sensors in the jacket and in the tank to determine if there is temperature stability during the second test, and if not, to generate an alert of a false test.

In some preferred examples, the apparatus further comprises a booster pump in the supply system, and the controller is configured to automatically actuate the booster pump to boost the jacket liquid to a desired set pressure for the second test.

In some preferred examples, further comprising a pressure controlled reducing valve to protect the tank jacket from being over-pressurized above its maximum test pressure.

In some preferred examples, the testing apparatus comprises a tank pressure sensor to detect the tank pressure.

In some preferred examples, the apparatus further comprises a tank liquid level sensor, and wherein the controller is configured to determine the tank pressure by processing tank level data supplied by the level sensor.

In some preferred examples, the apparatus comprises conductivity sensors mounted in spaced apart relationship to the jacket, and the controller is programmed with conductivity value for a tank liquid and a conductivity value for a jacket liquid, and the controller is configured to detect a change in conductivity between said sensors as indicative of ingress of said tank liquid from the tank to the jacket due to a leak.

In some preferred examples, the apparatus comprises a gas pressurizing system arranged to deliver gas under pressure above the tank liquid level to at least partly cause the tank pressure to exceed the jacket start pressure.

In some preferred examples, the controller is configured to automatically operate at set times, including during use of the tank in a production process.

In some preferred examples, the controller is configured to only initiate a test when the tank liquid level is above a jacket level during production.

In some preferred examples, the controller is automatically configured to log test result data for each of a plurality of tanks in a production plant, and the controller is configured to automatically log said test data associated with production data to relate production status with testing data.

We also describe a production plant comprising at least one tank, a supply to the tank, and a testing apparatus of any preceding claim linked with said tank or tanks.

We also describe a method performed by a testing apparatus of any example, for testing a tank and a jacket having an internal wall shared with the tank and an external wall, the method being performed by an electronic controller and comprising steps of:
  delivering liquid at pressure above atmospheric to the jacket,
  delivering liquid into the jacket at pressure above atmospheric,
  determining when the tank pressure is higher than a jacket start pressure, and then monitoring a parameter of the jacket to detect if there is a leak from the tank into the jacket.

In some preferred examples, the controller is determines when the tank is filled to a level above the tank jacket height for said step of determining when the tank pressure is higher than a jacket pressure.

In some preferred examples, the parameter is jacket pressure, the apparatus comprises a jacket pressure sensor and the controller performs steps of:
  after said delivering of liquid into the jacket, sealing the jacket,
  determining the jacket start pressure, said pressure being lower than the tank pressure,
  over a testing time period detecting if there is a change in pressure in the jacket which exceeds a tolerance level, and
  identifying that there is a potential leak in the jacket internal wall if there is an excessive jacket pressure change.

We also describe a testing apparatus for a tank with a jacket having an internal wall shared with the tank and an external wall, the apparatus comprising:
  a controller with digital data processors,
  a supply system for delivering liquid at pressure above atmospheric to the jacket,
  wherein the controller is configured to perform a first test by:
    causing the tank to be at least partly filled to a level above the tank jacket height to create a higher pressure in the tank than is in the jacket,
    delivering liquid into the jacket, and
    monitoring a parameter of the jacket to detect if there is a leak from the tank into the jacket.

In one example, the parameter is jacket pressure, and the method comprises the steps of:
  sealing the jacket,
  determining a start pressure of liquid in the jacket, said pressure being lower than the tank pressure,
  over a testing time period detecting if there is a change in pressure in the jacket which exceeds a tolerance level, and
  generating an alert of a potential leak in the jacket internal wall if there is an excessive jacket pressure change.

In one example, the controller is configured to determine tank pressure arising from the level of liquid in the tank before detecting if there is a pressure rise in the jacket.

In one example, the testing apparatus comprises a tank pressure sensor to detect pressure arising from liquid in the tank, and the controller is configured to determine, using an output of the tank pressure sensor, tank pressure arising from the level of liquid in the tank after the tank has been at least partly filled.

In one example, the testing apparatus comprises a jacket pressure senso to detect pressure in the jacket.

In one example, the testing apparatus comprises a venting valve for venting the jacket, and the controller is configured to cause the jacket to be vented by the venting valve before determining the start jacket pressure.

In one example, the controller is configured to deliver liquid under a pressure in the range of 2 Bar to 4 Bar into the jacket and to operate valves before determination of the jacket starting pressure. In one example, the controller is configured to start to determine the jacket start pressure only after it has determined that there is temperature uniformity between the tank and the jacket according to temperature sensors, to prevent a false test due to thermal expansion.

In one example, the controller is configured to use flow from the jacket as said parameter, and to leave the jacket vented and to detect if there is a flow of liquid from the jacket as an indication of a leak from the tank into the jacket.

In one example, the controller is configured to implement a second test by causing the supply system to deliver liquid into the jacket at an elevated pressure above atmospheric, to close the jacket by for example closing a jacket venting valve and determining if the pressure in the jacket drops over a time period, and generating an alert of a possible jacket external wall leak if there is a pressure drop in the jacket above a tolerance level.

In one example, the controller is configured to maintain a jacket pressure in the range of 2 Bar to 4 Bar for said second test.

In one example, the controller is configured to monitor temperature sensors in the jacket and in the tank to determine if there is temperature stability during the second test, and if not to generate an alert of a false test.

In one example, the apparatus further comprises a booster pump in the supply system, and the controller is configured to automatically actuate the booster pump to boost the jacket liquid to a desired set pressure for the second test.

In one example, the apparatus further comprises a pressure controlled reducing valve to protect the tank jacket from being over-pressurized above its maximum test pressure.

Preferably, the controller is configured to operate at set times including during use of the tank in a production process.

Preferably, the apparatus further comprises a liquid level sensor and wherein the controller is configured to check the tank pressure by processing tank level data supplied by the level sensor. Preferably, the controller is configured to log test result data for each of a plurality of tanks in a production plant. Preferably, the controller is configured to log said test data associated with production data to relate production status with testing data.

We also describe a production plant comprising at least one tank and a testing apparatus of any example described herein linked with said tank or tanks.

DETAILED DESCRIPTION OF THE INVENTION

The invention will be more clearly understood from the following description of some embodiments thereof, given by way of example only with reference to the accompanying drawings in which:

FIG. 1 is a sectional view of a tank and a testing apparatus linked with the tank.

Referring to FIG. 1 a tank system 1 has a generally cylindrical tank 2 shown in elevation, the tank having a capacity of between 10 L and 5,000,000 L, and with a cooling/heating jacket 3 around a lower portion of the tank 2 with a capacity of between 1 and 10,000 L. The tank and jacket size may vary depending on the application required for each tank. The tank 2 has a vent 5 in an upper dished top wall 4. The tank has a wall 6 part of which is surrounded by the jacket 3, and the jacket 3 has an external wall 7 on one side, and the tank wall 6 on the inside. An automated testing apparatus 8 is shown linked to the jacket 3. Also, there is a valve V4 on an inlet/outlet coupler of the tank.

The testing apparatus 8 comprises a water supply system 10 linked by a feed line 11 with a valve V1 to a port in a lower part of the jacket. There is a return line 12 with a valve V2 from a port at a higher level of the jacket 3, linked back to the supply system 10. The return line 12 also has a pressure relief valve 14 with a drain 13.

Also, the testing system 8 comprises a venting valve V3 linked to a top edge of the jacket 3. There is a flow meter FM1 in line with the valve V3.

The testing system 8 also comprises an auxiliary supply 20 with a booster pump PU1 for drawing from the supply 10 via an ON/OFF valve V6 and delivering water on the supply line 11 via a pressure control valve 21 and an ON/OFF valve V5.

The auxiliary supply 20 is used in the event that the pressure from the water supply system 10 is insufficient to generate a pressure that is required to complete a pressure test. For example, if the system 10 can only generate 3 Bar and a pressure of 6 Bar is required, then the booster pump PU1 provides this required pressure.

A controller, not shown, with digital data processors is linked to the components of the testing apparatus 8. The controller is programmed to implement a testing method as set out below. The controller is also linked to a pressure sensor P2 which is arranged to detect pressure within the tank 2 (arising from inflow of liquid into the tank 2 via the tank fill valve V4). It is also linked with a level sensor L1 arranged to detect level of liquid in the tank 2.

Test 1

The tank 2 is filled to a set high level 30, this level being confirmed by the level sensor L1 (this level sensor being positioned at the most suitable height position for normal fill level for testing). The valve V4 closes to stabilize the tank level. This tank high level gives rise to a pressure depending on the liquid height level in the tank, and this can be indicated by calculation using the output from the tank pressure sensor P2 situated at the lowest level of the tank 2.

When the tank level is confirmed, the valves V1 and V2 are closed so that the jacket is isolated from the supply system 10 after water has been pumped into it at a pressure in the range of 2 Bar to 4 Bar. This purges air from the jacket, allowing accurate measurements to be performed.

After a settling period of time of say 60 seconds, the temperatures in the tank and the jacket are confirmed to be the same, based on the outputs of temperature sensors T1 and T2 at the jacket and at the tank above the jacket respectively, to prevent a false test due to thermal expansion.

Then the venting valve V3 is opened, relieving the pressure in the tank jacket to atmospheric plus the height pressure of the tank jacket, say 100 mBar. This value depends on the tank jacket size, for example if the jacket is 1 m high this will generate an estimated pressure of 100 mBar, but if it is 2 m high then pressure will be 200 mBar. This jacket starting pressure is calculated on the basis of the level of water in the jacket and atmospheric. There may be an additional pressure sensor at a low level of the jacket to detect this, instead of or in addition to calculating it.

With V1 and V2 closed and V3 opened, the pressure in the tank jacket is now at atmospheric pressure plus the pressure arising from the liquid in the jacket. The jacket pressure sensor P1 is positioned at a level in the jacket so that it can reasonably read the level of liquid above P1 to the position on V3, say 100 mBar, this will be the test level set point.

Hence, at this stage there is a test set point for the jacket pressure which is dependent on the position of P1 in the jacket 3, as the jacket height generates the gravitational pressure of the liquid in the jacket plus the height of the V3 vent above the jacket. For example, if the liquid in the jacket plus the height of V3 vent pipe is 1 m above the position of P1 this will equal 100 mB pressure above atmospheric.

Then, V3 is closed to seal the pressure in the tank jacket. The pressure sensor P1 in the jacket is above the tank pressure sensor P2, and so there is a rise in pressure on P1 above the test set point say 0.100 mB, this will indicate there is a crack between the tank and the tank jacket. This rise detected on P1 is due to ingress of liquid from the tank into the jacket, giving rise to an increase in pressure in the jacket as it is sealed by V3 being closed.

If the tank jacket 3 is on the full height of the tank, similar in level and height to the tank level, this test will not be able to use a tank liquid higher level to detect if there is a crack on the tank side of the jacket. However, in another embodiment, the test system includes a pump and valve to deliver air or other gas under pressure above the liquid in the tank. This pressurizes the tank to a level above that of the jacket, and if there is a leak the system will detect either a pressure rise at P1 (with V3 closed) or a flow on FM1 (with V3 open, see below).

Flow Meter Testing

As an alternative to pressure sensing or in addition to it, the flowmeter FM1 may be used to detect a leak from the tank to the jacket during Test 1. If there is a flow detected (even down to the level of some drops) on FM1 this will indicate there is a leak from the tank to the tank jacket.

After a settling time of, say, 60 seconds, the temperatures in the tank and the jacket are confirmed to be the same, based on the outputs of temperature sensors T1 and T2 at the jacket and at the tank above the jacket respectively, to prevent a false test due to thermal expansion. Then V3 stays open, and the test commences. If there is a flow detected in milliliters per minute (this can vary depending on the tank height and the size of the crack) on FM1, this will indicate there is a leak in the tank jacket.

The apparatus may be adapted to perform both pressure and flow sensing, but of course it could not perform both simultaneously because the jacket needs to be sealed for the pressure sensing and vented via the flow meter for the flow sensing.

Conductivity Testing

In addition to, or instead of pressure and/or flow being testing parameters, conductivity between points on the jacket may be measured and monitored for any increases arising from ingress of liquid into the jacket arising from a leak. The conductivity of the tank liquid and the jacket liquid need to be known. For example, milk has a conductivity of 5000 mS and cooling water n the jacket has a value of 1000 mS. The jacket is isolated and vented to atmosphere. If there is a rise detected in the jacket conductivity, this is indicative of milk entering the jacket. This test would take much longer than if the parameters are pressure and/or flow and so is not preferred.

Conductivity-based sensing may be performed in addition to pressure-based and/or flow-based sensing.

Test 2

Water is supplied to the tank jacket via the supply system 10. This is normally supplied at between 2 and 4 Bars pressure. V1 and V2 are opened, V3 is closed, and when the pressure at the jacket pressure sensor P1 is at the Test 2 set pressure, say 2 Bar, V1, V2, close, and V3 stays closed to maintain this 2 Bar pressure on P1, while also monitoring if T1 and T2 are at the same temperature (this again to prevent a false test due to thermal expansion).

If the pressure from the water supply system 10 is insufficient to supply the required test pressure the booster pump PU1 is used so that when V1 and V2 close as described above, if P1 is not at the required test pressure, PU1 starts automatically to boost the water to the required set pressure. This set pressure can be controlled either by the pressure controlled reducing valve 21 or by the pump's maximum pumping pressure. PU1 can be isolated by two automatic valves V5 and V6 and automatically controlled to only open during the test when V1 and V2 close. The pressure relief valve PRV1/13 protects the tank jacket from being over-pressurized above its maximum test pressure.

If, after a time delay of say 10 minutes, there is a drop in pressure on the jacket pressure sensor P1, this will indicate that there is a leak in the tank jacket 3, and this leak may be into the tank via the jacket internal wall 6 or into the external/atmospheric side of the jacket via the jacket external wall 7. If the tank is empty when this test is done, then Test 2 can detect a leak in the jacket internal wall 6.

The tank jacket 3 tests can be then recorded via a digital or other recording device and test results sent to a receiver via a Text, Bluetooth, Internet or similar communication device. These test results can then be monitored on a daily basis protecting the integrity of all monitored tanks be it one or any number up to say 1,000 tanks. Then, if a crack is detected in any tank immediate action can be taken to repair this leaking jacket, greatly reducing the possibility of undetected contamination to the tank contents from the cooling/heating jacket and also loss of cooling/heating water.

It will be appreciated that a crack can be detected automatically and very quickly without taking the tank out of service. If there is a crack, the system 8 can detect if the crack is in the tank side or the outer side of the jacket. While the system quickly and conveniently detects if there is a crack in the cooling jacket or tank at the jacket wall, it does not detect the exact location of the crack. Hence, to locate and repair the crack will require that the tank be taken out of service and if the location of the crack is not visible this will also require eddy current testing, dye testing or another similar test method to detect the crack location.

With the above test procedure, it is possible to automatically test the tank jacket as many times as required when the tank is used without taking the tank out of service or using test engineers.

Components of embodiments can be employed in other embodiments in a manner as would be understood by a person of ordinary skill in the art. The invention is not limited to the embodiments described but may be varied in construction and detail. In one alternative, the jacket forms a volume which extends into the tank by for example a coil.

In another alternative, the pressure rise in the tank which provides for ingress of liquid into the jacket through any leak may be provided by pressurised air or other gas above the tank liquid level. This may be done if the jacket height is the full height of the tank. This is not preferred because it may cause some interruption in normal operation of the tank, but may be effective where circumstances require it, such as where the jacket extends for the full height of the tank. It is envisaged, for example that a system may perform automated testing of multiple tanks, and a subset of the tanks/jackets are tested by using pressurised gas, but the majority do not need such an arrangement.

The invention claimed is:

1. A testing apparatus for a tank and a jacket having an internal wall shared with the tank and an external wall, the apparatus comprising:
   a controller with digital data processors,
   a supply system for delivering liquid at pressure above atmospheric to the jacket,
   wherein the controller is configured to perform a first test by:
      delivering liquid into the jacket at pressure above atmospheric,
      determining when the tank pressure is higher than a jacket start pressure, and then monitoring a parameter of the jacket to detect if there is a leak from the tank into the jacket,
   wherein the controller is configured to determine when the tank is filled to a level above the tank jacket height for said step of determining when the tank pressure is higher than a jacket pressure.

2. The testing apparatus as claimed in claim 1, wherein the testing apparatus comprises a venting valve for venting the jacket, and the controller is configured to cause the jacket to be vented by the venting valve before determining the jacket start pressure.

3. The testing apparatus as claimed in claim 1, wherein the controller is configured to deliver liquid under a pressure in the range of 2 Bar to 4 Bar into the jacket.

4. The testing apparatus as claimed in claim 1, wherein the controller is configured to determine the jacket start pressure only after it has determined that there is temperature uniformity between the tank and the jacket according to temperature sensors, to prevent a false test due to thermal expansion.

5. The testing apparatus as claimed in claim 1, wherein the apparatus comprises a flow meter linked with the jacket, and the controller is configured to use sensed flow from the jacket as said parameter, in which the controller is configured to vent the jacket only via the flow meter and to detect if there is a flow of liquid from the jacket and through the flow meter as an indication of a leak from the tank into the jacket.

6. The testing apparatus as claimed in claim 1, wherein the controller is configured to implement a second test by causing the supply system to deliver liquid into the jacket at an elevated pressure above atmospheric, to seal the jacket by for example closing a jacket venting valve, and determining if the pressure in the jacket drops over a time period, and generating an alert of a possible jacket external wall leak if there is a pressure drop in the jacket above a tolerance level, and wherein the controller is configured to maintain a jacket pressure in the range of 2 Bar to 4 Bar for said second test.

7. The testing apparatus as claimed in claim 1, wherein the controller is configured to implement a second test by causing the supply system to deliver liquid into the jacket at an elevated pressure above atmospheric, to seal the jacket by for example closing a jacket venting valve, and determining if the pressure in the jacket drops over a time period, and generating an alert of a possible jacket external wall leak if there is a pressure drop in the jacket above a tolerance level; and wherein the controller is configured to monitor temperature sensors in the jacket and in the tank to determine if there is temperature stability during the second test, and if not, to generate an alert of a false test.

8. The testing apparatus as claimed in claim 1, wherein the controller is configured to implement a second test by causing the supply system to deliver liquid into the jacket at an elevated pressure above atmospheric, to seal the jacket by for example closing a jacket venting valve, and determining if the pressure in the jacket drops over a time period, and generating an alert of a possible jacket external wall leak if there is a pressure drop in the jacket above a tolerance level; and the apparatus further comprises a booster pump in the supply system, and the controller is configured to automatically actuate the booster pump to boost the jacket liquid to a desired set pressure for the second test.

9. The testing apparatus as claimed in claim 1, wherein the controller is configured to implement a second test by causing the supply system to deliver liquid into the jacket at an elevated pressure above atmospheric, to seal the jacket by for example closing a jacket venting valve, and determining if the pressure in the jacket drops over a time period, and generating an alert of a possible jacket external wall leak if there is a pressure drop in the jacket above a tolerance level; and the apparatus further comprises a pressure controlled reducing valve to protect the tank jacket from being over-pressurized above its maximum test pressure.

10. The testing apparatus as claimed in claim 1, wherein the testing apparatus comprises a tank pressure sensor to detect the tank pressure.

11. The testing apparatus as claimed in claim 1, further comprising a tank liquid level sensor, and wherein the controller is configured to determine the tank pressure by processing tank level data supplied by the level sensor.

12. The testing apparatus as claimed in claim 1, wherein the apparatus comprises conductivity sensors mounted in spaced apart relationship to the jacket, and the controller is programmed with conductivity value for a tank liquid and a conductivity value for a jacket liquid, and the controller is configured to detect a change in conductivity between said sensors as indicative of ingress of said tank liquid from the tank to the jacket due to a leak.

13. The testing apparatus as claimed in claim 1, wherein the apparatus comprises a gas pressurizing system arranged to deliver gas under pressure above the tank liquid level to at least partly cause the tank pressure to exceed the jacket start pressure.

14. The testing apparatus as claimed in claim 1, wherein the controller is configured to automatically operate at set times, including during use of the tank in a production process.

15. The testing apparatus as claimed in claim 1, wherein the controller is configured to automatically operate at set times, including during use of the tank in a production process; and wherein the controller is configured to only initiate a test when the tank liquid level is above a jacket level during production.

16. The testing apparatus as claimed in claim 1, wherein the controller is configured to log test result data for each of a plurality of tanks in a production plant, and to log said test data associated with production data to relate production status with testing data.

17. A testing apparatus for a tank and a jacket having an internal wall shared with the tank and an external wall, the apparatus comprising:
a controller with digital data processors,
a supply system for delivering liquid at pressure above atmospheric to the jacket,
wherein the controller is configured to perform a first test by:
delivering liquid into the jacket at pressure above atmospheric,
determining when the tank pressure is higher than a jacket start pressure, and then monitoring a parameter of the jacket to detect if there is a leak from the tank into the jacket,
wherein the parameter is jacket pressure, the apparatus comprises a jacket pressure sensor and the controller is configured to perform steps of:
after said delivering of liquid into the jacket, sealing the jacket, determining the jacket start pressure, said pressure being lower than the tank pressure,
over a testing time period detecting if there is a change in pressure in the jacket which exceeds a tolerance level, and
identifying that there is a potential leak in the jacket internal wall if there is an excessive jacket pressure change.

18. A testing apparatus for a tank and a jacket having an internal wall shared with the tank and an external wall, the apparatus comprising:
a controller with digital data processors,
a supply system for delivering liquid at pressure above atmospheric to the jacket,
wherein the controller is configured to perform a first test by:
delivering liquid into the jacket at pressure above atmospheric,
determining when the tank pressure is higher than a jacket start pressure, and then monitoring a parameter of the jacket to detect if there is a leak from the tank into the jacket,
wherein the controller is configured to implement a second test by causing the supply system to deliver liquid into the jacket at an elevated pressure above atmospheric, to seal the jacket by for example closing a jacket venting valve, and determining if the pressure in the jacket drops over a time period, and generating an alert of a possible jacket external wall leak if there is a pressure drop in the jacket above a tolerance level.

19. A production plant comprising at least one tank, a supply to the tank, and a testing apparatus linked with said tank or tanks, said testing apparatus comprising:
a controller with digital data processors,
a supply system for delivering liquid at pressure above atmospheric to a jacket,
wherein the controller is configured to perform a first test by:
delivering liquid into the jacket at pressure above atmospheric,
determining when the tank pressure is higher than a jacket start pressure, and monitoring a parameter of the jacket to detect if there is a leak from the tank into the jacket,
wherein the controller is configured to determine when the tank is filled to a level above the tank jacket height for said step of determining when the tank pressure is higher than a jacket pressure.

* * * * *